United States Patent [19]

Holzhausen

[11] Patent Number: 4,783,769
[45] Date of Patent: Nov. 8, 1988

[54] METHOD OF DETERMINING POSITION AND DIMENSIONS OF A SUBSURFACE STRUCTURE INTERSECTING A WELLBORE IN THE EARTH

[75] Inventor: Gary R. Holzhausen, Santa Cruz, Calif.

[73] Assignee: Gas Research Institute, Chicago, Ill.

[21] Appl. No.: 841,644

[22] Filed: Mar. 20, 1986

[51] Int. Cl.[4] ........................................... G01V 1/133
[52] U.S. Cl. ......................................... 367/35; 367/86
[58] Field of Search ...................... 367/30, 35, 86, 73; 175/48; 166/250, 254; 181/105; 73/155

[56] References Cited

U.S. PATENT DOCUMENTS

| | | | |
|---|---|---|---|
| 4,271,696 | 6/1981 | Wood | 73/432.1 X |
| 4,353,244 | 10/1982 | Wood | 73/37 |
| 4,372,380 | 2/1983 | Smith et al. | 73/155 X |
| 4,393,933 | 7/1983 | Nolte et al. | 166/250 |
| 4,432,078 | 2/1984 | Silverman | 367/14 X |
| 4,458,245 | 7/1984 | Crosnier et al. | 181/105 X |
| 4,531,403 | 7/1985 | de Korompay et al. | 73/37 X |

OTHER PUBLICATIONS

Fluid Transients; 1982; Benjamin Wylie et al.; published by Thomson-Shore, Dexter MI.
E. B. Wiley et al., *Fluid Transients*, FEB Press Ann Arbor, Mich. 1982.
G. R. Holzhausen & H. N. Egan, "Fracture Diagnostics in East Texas and Weste Colorado Using the Hydraulic-Impedance Method," presented May 18-21, 198 at Unconventional Gas Technology Symposium of the Society of Petroleum Engineers held in Louisville, KY.
G. R. Holzhausen & R. P. Gooch, "Impedance of Hydraulic Fractures: Its Measurement and Use for Estimating Fracture Closure Pressure and Dimensions," presented May 19-22, 1985, at SPE/DOE 1985 Low Permeability Gas Reservoirs held in Denver, CO.
Bernard Chouet, "Dynamics of a Fluid-Driven Crack in Three Dimensions by the Finite Difference Method," Dec. 10, 1986, Journal of Geophysical Research, vol. 91, No. B14, pp. 13, 967-713, 992.
Bernard Chouet, "Ground Motion in the Near Field of a Fluid-Driven Crack and Its Interpretation in the Study of Shallow Volcnic Tremor", Journal of Geophysical Research, vol. 86, No. B7, pp. 5985-6016, Jul. 10, 1981.

*Primary Examiner*—Thomas H. Tarcza
*Assistant Examiner*—Tod R. Swann
*Attorney, Agent, or Firm*—Alan H. MacPherson; Paul J. Winters; Norman R. Klivans

[57] ABSTRACT

The growth of a hydraulic fracture increases the period of free oscillations in the well connected to the fracture. Simultaneously, the decay rate of free oscillations decreases. The properties of forced oscillations in a well also change during fracture growth. All of these effects result from the changing impedance of the hydraulic fracture that intersects the well. Hydraulic fracture impedance can be defined in terms of the hydraulic resistance and the hydraulic capacitance of a fracture. Fracture impedance can be determined directly by measuring the ratio of down hole pressure and flow oscillations or indirectly from well head impedance measurements using impedance transfer functions. Well head pressure measurements can also be used to evaluate fracture impedance by comparing them to pressure oscillations computed with hydraulic models that include fractures with different impedances. Because impedance is a function of fracture dimensions and the elasticity of the surrounding rock, impedance analysis can be used to evaluate the geometry of the fracture by analyzing the data which results from free and forced oscillations in the well, and looking for a match between the data and theoretical models of projected shapes of the fracture.

35 Claims, 9 Drawing Sheets

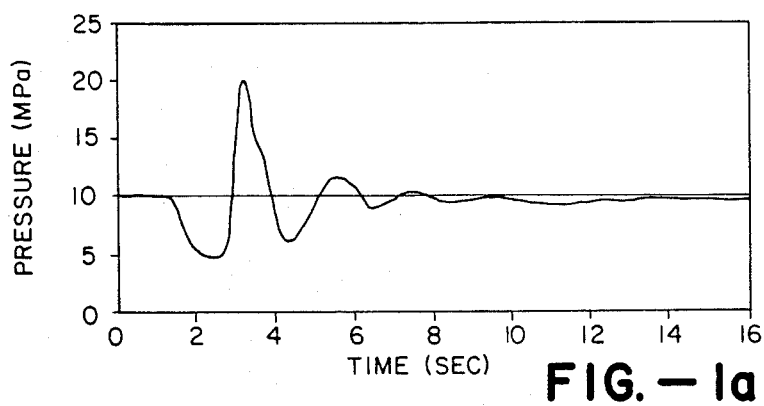
FIG.—1a
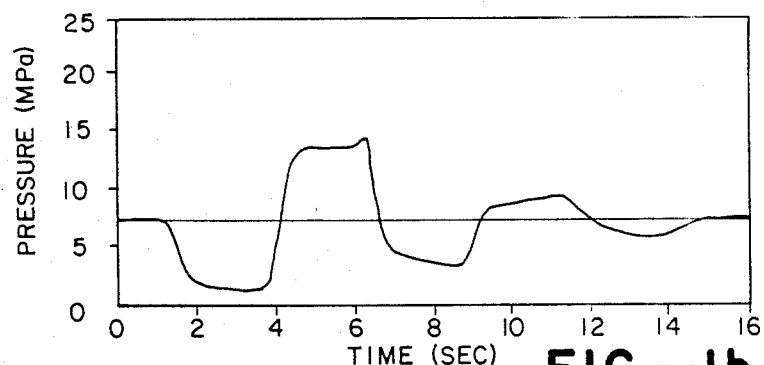
FIG.—1b
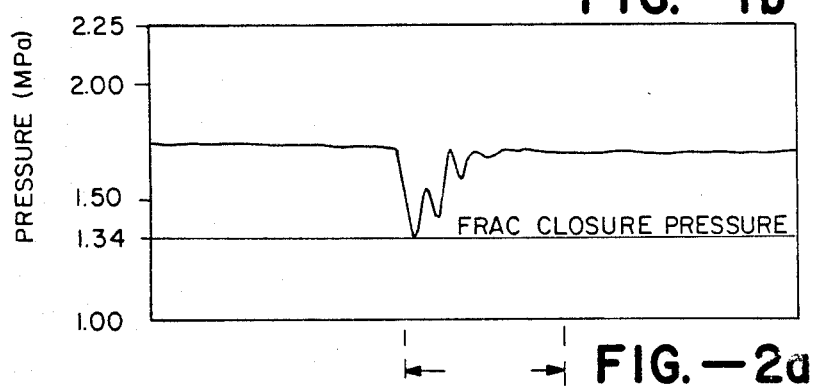
FIG.—2a
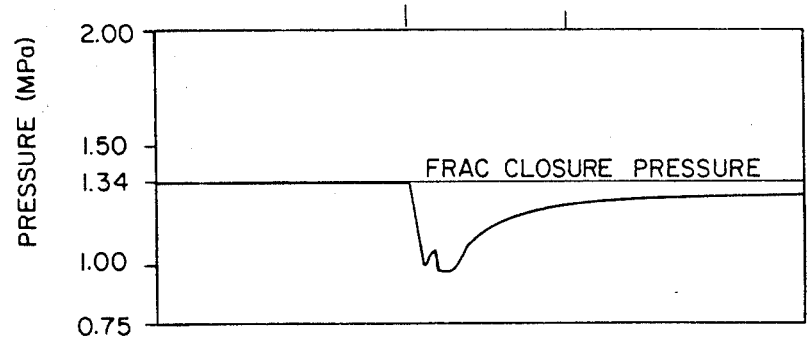
FIG.—2b

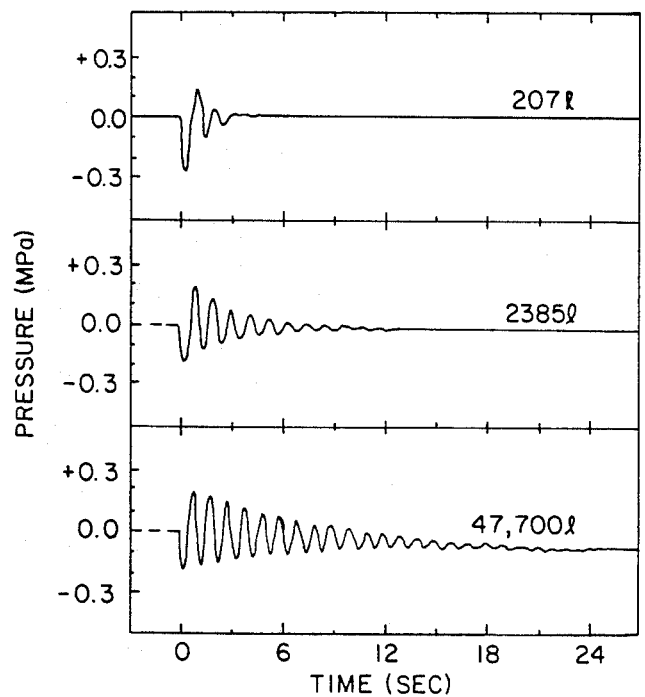
FIG.—3
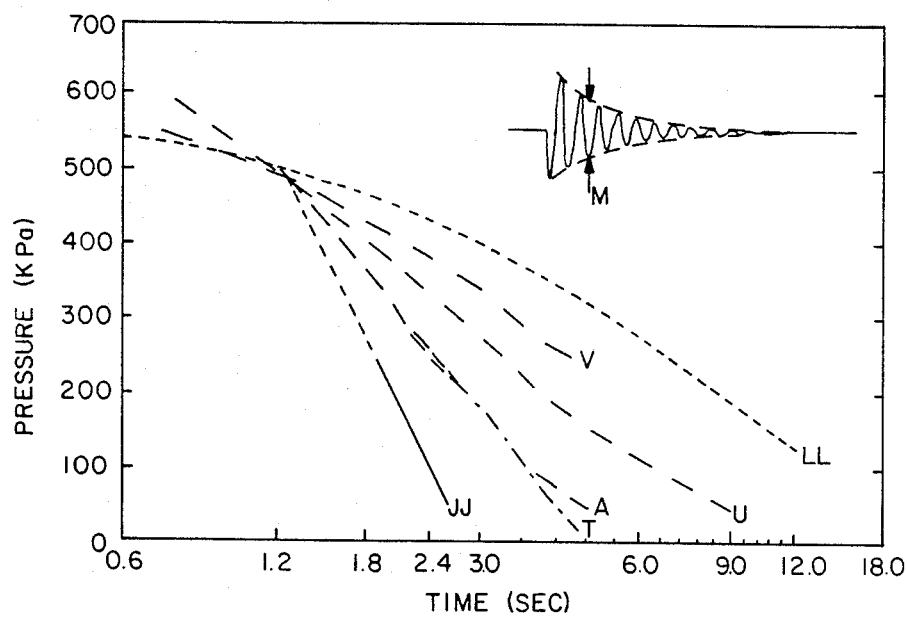
FIG.—4

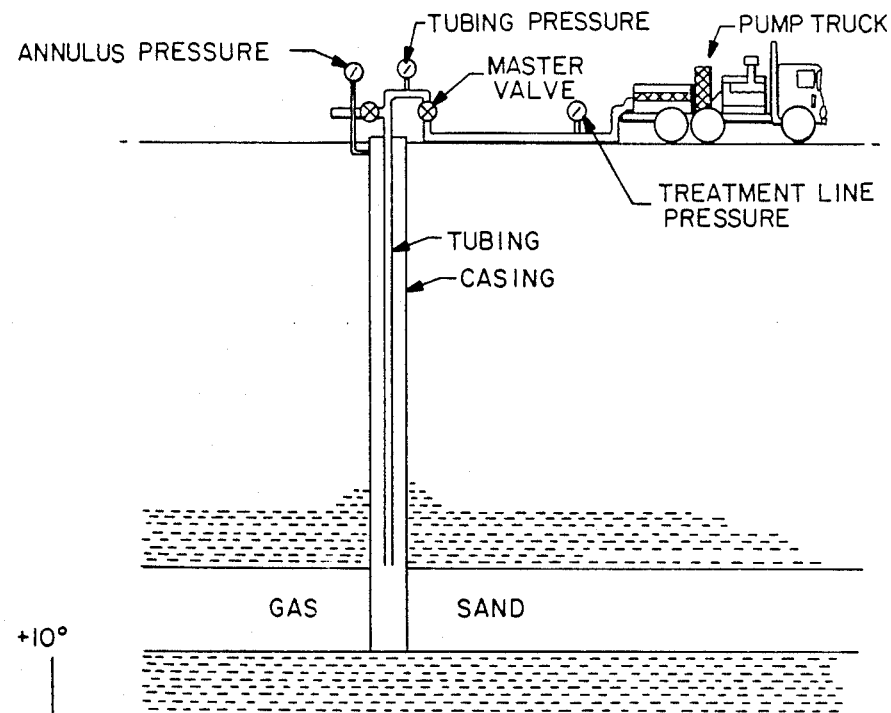
FIG.—5
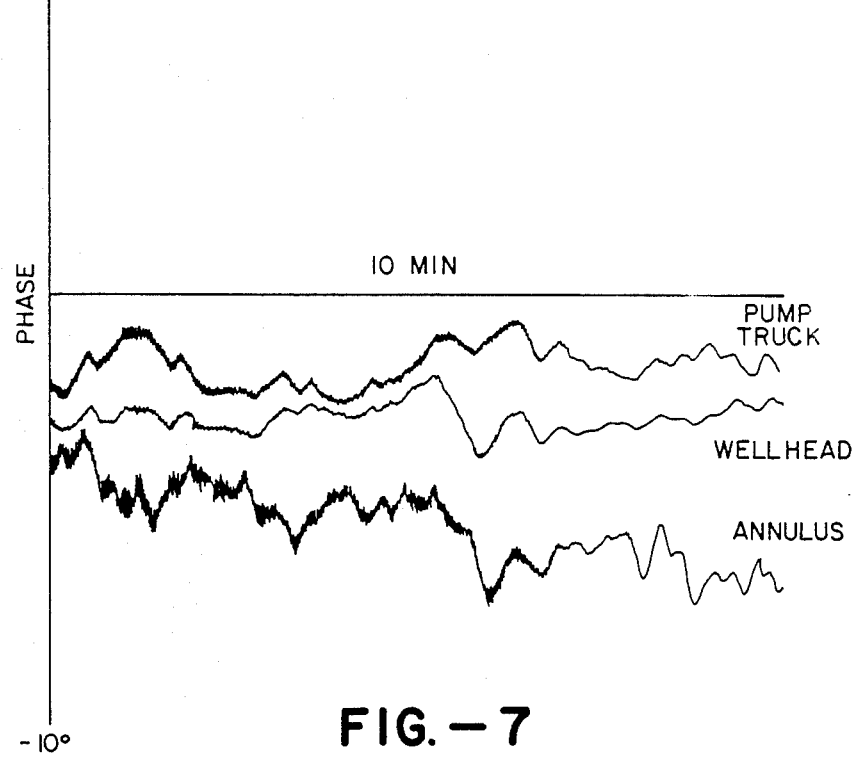
FIG.—7

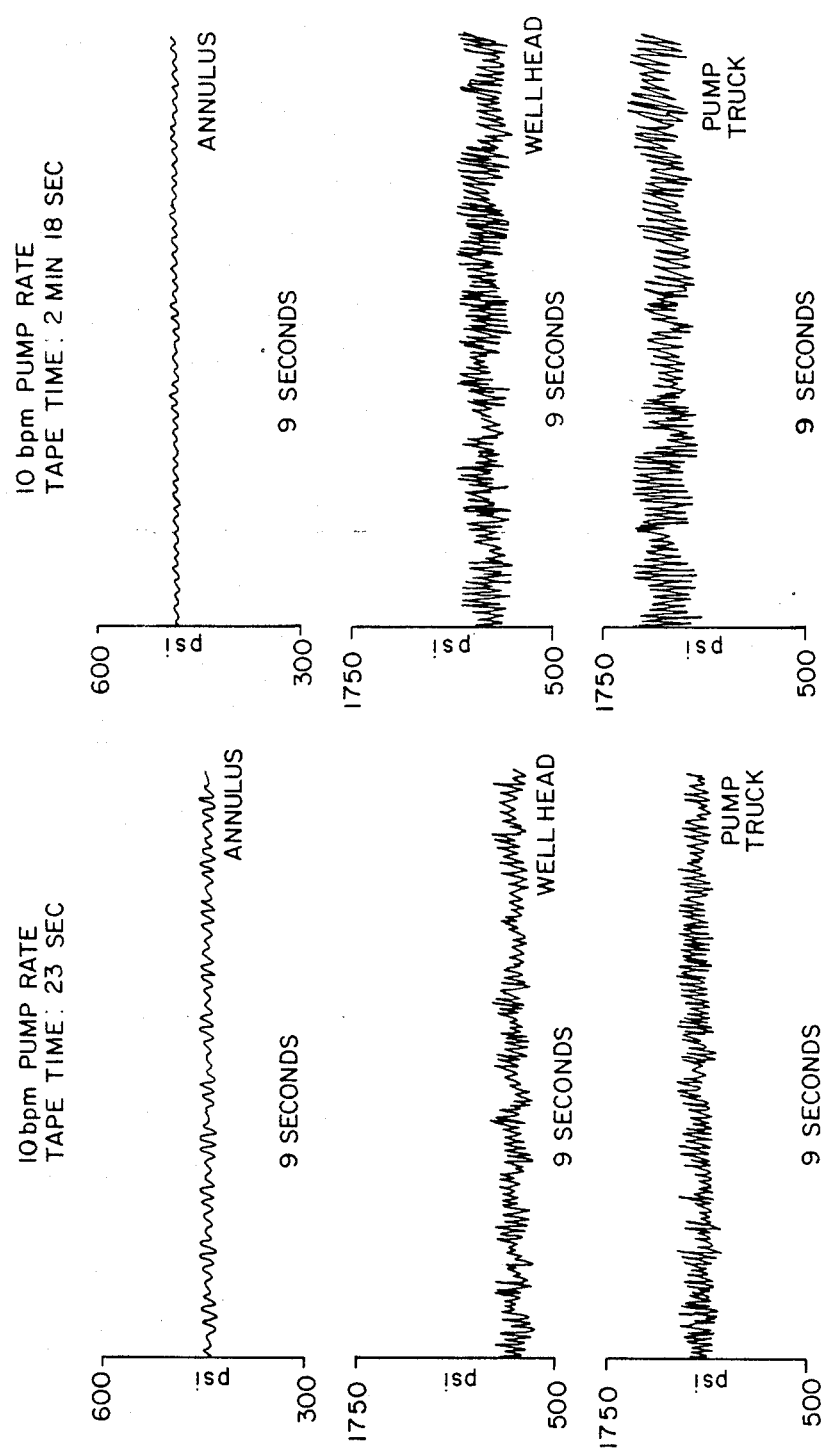
FIG.—6

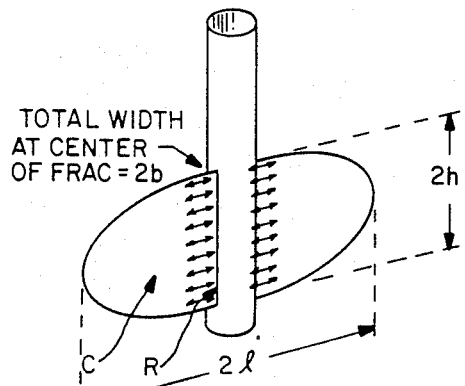
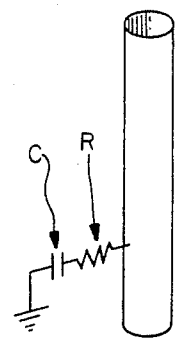
FIG.—8A  FIG.—8B
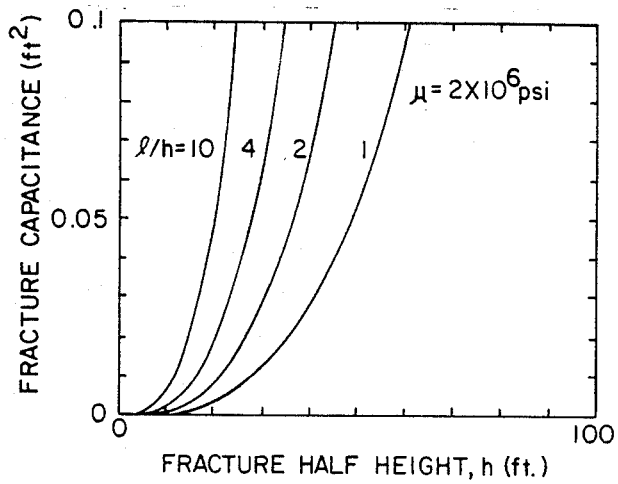
FIG.—9A
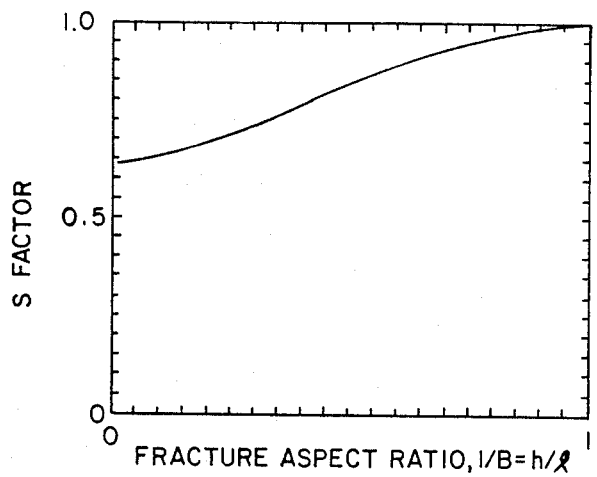
FIG.—9B

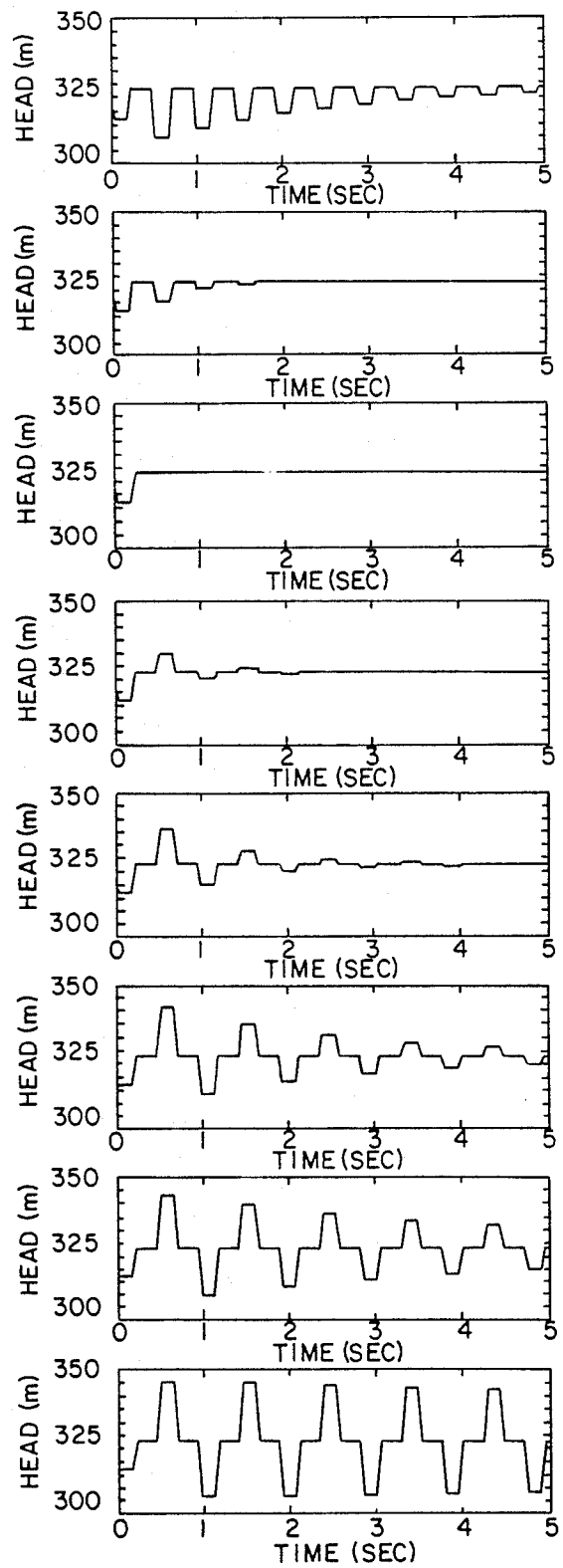
FIG.−10

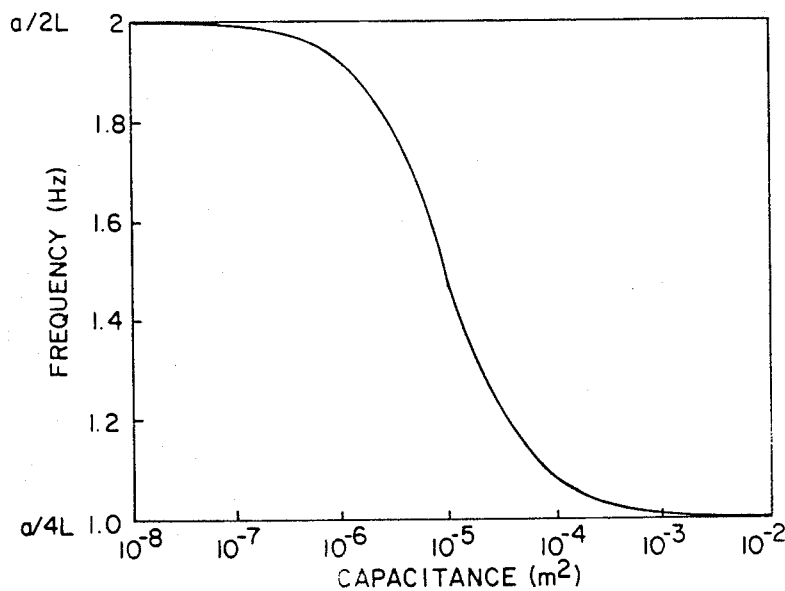
FIG.—11
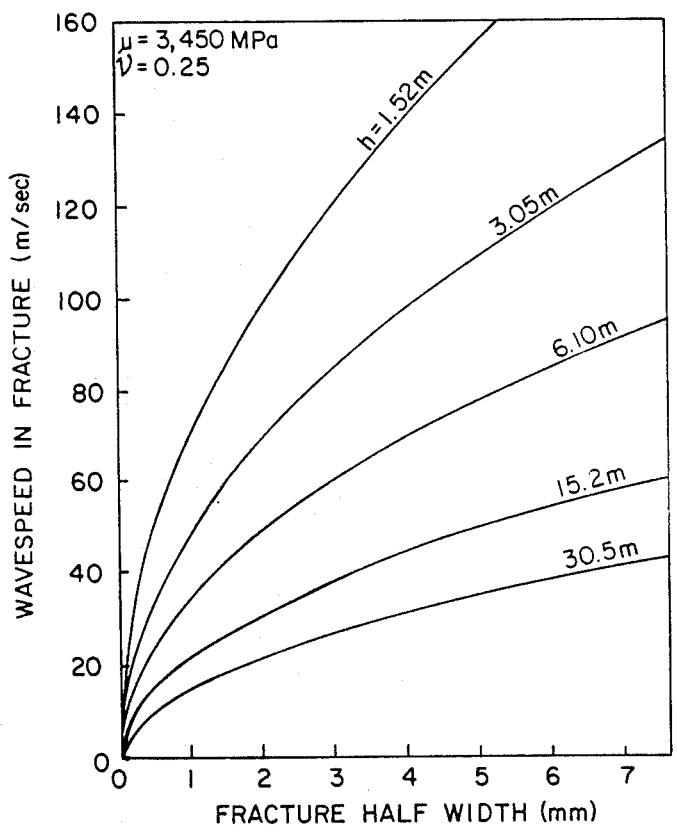
FIG.—12

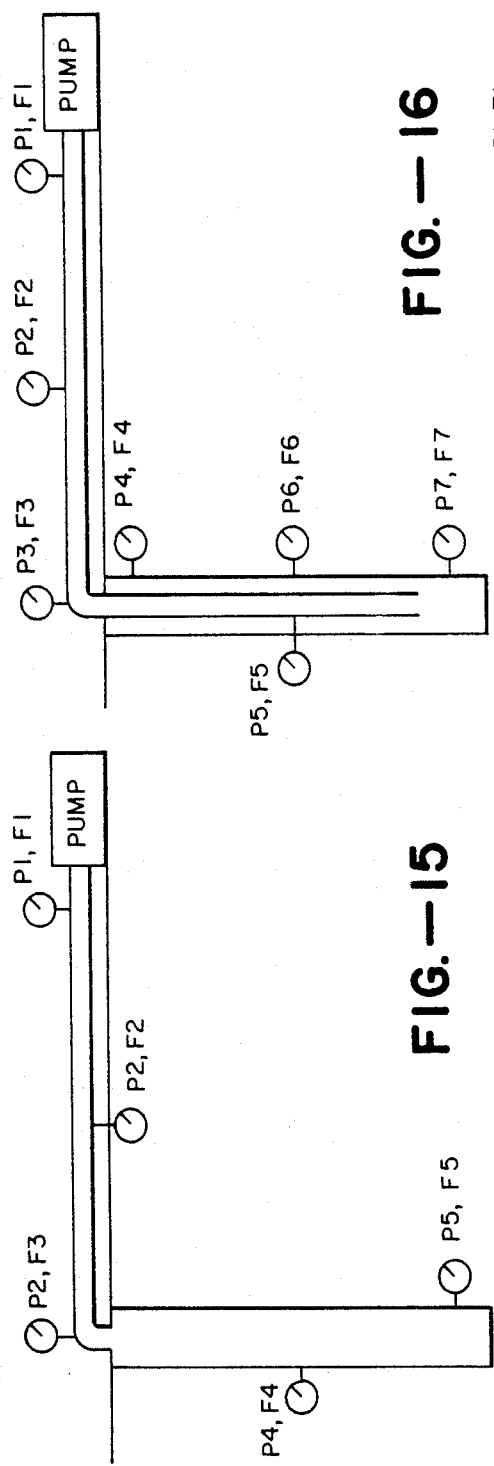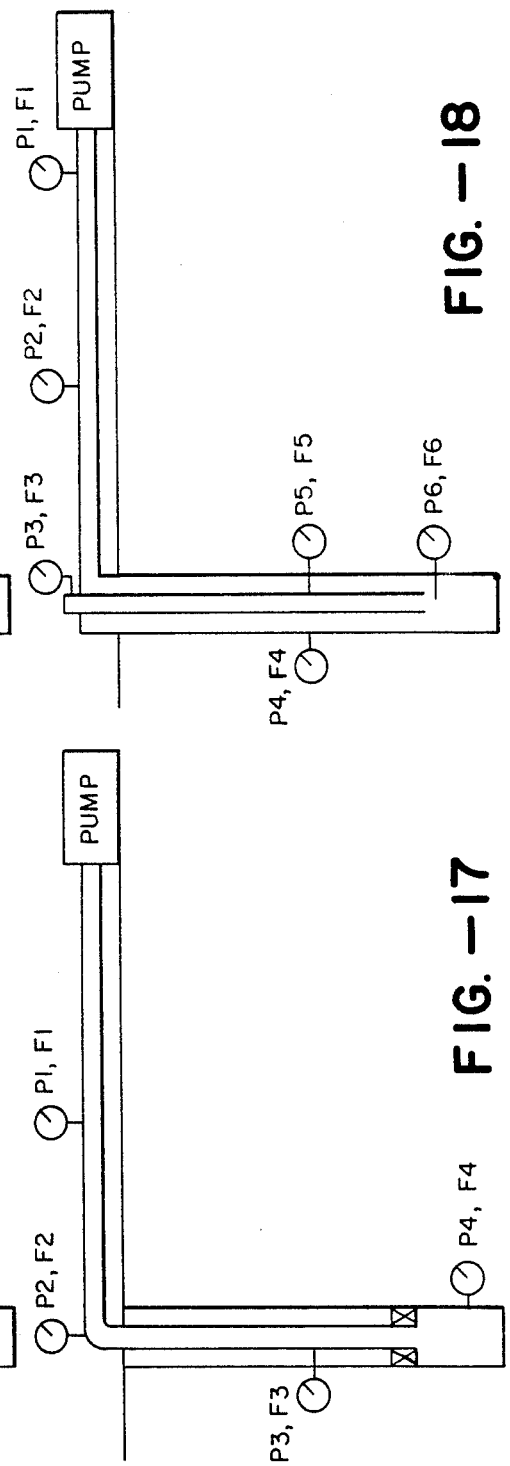

METHOD OF DETERMINING POSITION AND DIMENSIONS OF A SUBSURFACE STRUCTURE INTERSECTING A WELLBORE IN THE EARTH

Cross reference to related application: An application entitled Hydraulic Fracture Analysis Method invented by Gary R Holzhausen, Ser. No. 841,645, filed contemporaneously herewith, discloses related principles of fracture analysis and is incorporated herein by reference.

In recovery of oil, gas and other valuable minerals from subsurface geologic reservoirs, it is important to obtain information about subsurface geologic conditions such as permeability of the reservoir rock and the geometry of natural and manmade fractures. A common method of improving the recovery of valuable economic fluids such as oil, gas and mineral solutions is injection of other fluids (liquids or gases) under pressure into a wellbore to induce fracturing of the rock containing the economic resource. In many cases granular solids known as "proppants" are added to the fluid for the purpose of propping open the induced fractures in order to enhance the recovery of the economic resource. The position and dimensions of fractures produced in this manner (known as hydraulic fractures) constitute information of great economic significance.

It is an objective of this invention to provide an improved method for determining the location and dimensions of an underground hydraulic fracture.

More specifically, it is an objective of this invention to provide an improved method for analyzing a hydraulic fracture which is in contact with a wellbore which reaches the surface.

Knowledge of fracture position and dimensions permits wells to be drilled in optimal locations to take advantage of the non-uniform drainage or injection patterns that hydraulic fractures produce. In this manner, it may be possible to extract more of the resources in a field using a smaller number a wells than would be possible if the fracture geometry were not known. Furthermore, information about the rate of hydraulic fracture growth can be used in improving the design and production of the fractures, thereby resulting in economic savings to the individuals or organizations who use hydraulic fractures in their operations. Finally, hydraulic fractures can be used to sense the magnitude of in situ stresses in the earth at the fracturing depth. In situ stress information can be used to improve the engineering of hydraulic fracturing programs and other resource recovery operations. Thus, processes to obtain information about fracture position and dimensions, and about other subsurface parameters such as permeability and in situ stress can yield engineering data of considerable economic significance.

In the above referenced invention disclosure, this inventor described a method for determining hydraulic fracture dimensions, growth rate and orientation by applying oscillatory fluid pressures and/or flows to a geologic formation, measuring the resulting modified pressure and/or flow oscillations, and interpreting these measured oscillations using hydraulic models.

It is an objective of the present invention to expand upon the previous disclosure in many of these areas, as well as to describe methods of determining in situ stress and other subsurface parameters using oscillatory pressures and flows in the wellbore.

As outlined in the associated application, the geometry of a hydraulic fracture can be evaluated using the following steps:

(1) determine the wave speed and viscosity of the fluids in the wellbore and fracture;

(2) define the elastic properties of the material surrounding the well and the fracture;

(3) define the geometry of the well and the location of the points of the fluid flow from the well into the fraction (these might be the locations of perforations in the well casing, or the location of uncased portions of the well);

(4) perturb the fluid in the wellbore in order to create transient pressure and flow conditions in the well. This perturbation may be produced by rapidly removing a slug of fluid from the pressurized well by opening and closing a valve, or rapidly injecting a slug of fluid, resulting in free oscillation in the well; or by the continuous oscillatory action of reciprocating pumps, resulting in what shall be called forced oscillation in the well; or by other methods that cause transient fluid flow;

(5) measure the resulting oscillatory fluid behavior with pressure transducers and/or flow meters at the well head and/or in the well;

(6) using mathematic models, compute the hydraulic fracture geometry that is most consistent with the measured pressure and flow oscillations.

A central assumption in this invention is the concept that a hydraulic fracture is an element of a hydraulic system consisting of (1) the tubular goods of the well and any interconnected tubular goods on the ground surface, (2) the fluid in the well and fracture, and (3) the hydraulic fracture structure itself. If the first two elements, tubular goods and fluid properties, are held constant, changes in the oscillatory fluid pressure and flow can be attributed to changes in fracture geometry.

The following constitutes a general conceptual framework for the analysis of hydrualic fractures which underlies this invention.

Assume that a sensor is placed at the bottom of a well beside a low-permeability zone about to be fractured. This sensor is able to precisely measure very small changes of both pressure and flow as injection rates are increased. In addition, the sensor can measure oscillatory pressures and flows resulting from the reciprocating action of the pistons in the fracturing pumps. When injection begins, the pumps force fluid into the well, although flow into the formation is not possible since breakdown has not occurred. At the same time, the pressure begins to rise because the pumps are compressing the fluid in the well. Our specialized tool would therefore measure large pressure oscillations (in addition to large static pressures) but would measure zero flow. The corresponding ratio of pressure to flow would be infinite.

We know that formation breakdown will occur when the downhole pressure becomes great enough to overcome both the rock strength and the minimum in situ compressive stress at the treatment depth. If we were to again measure pressure and flow after fracture growth has begun, we would expect static and oscillatory pressures to be less than before, while flow would be greater because fluid is now moving from the well into the fracture. The ratio of pressure to flow would thus be less than in the prefracturing case.

As the fracture continues to grow, we could expect the relative values of downhole pressure and downhole flow to continue to change. Because fracture growth is accompanied by an increase in the cross-sectional area of the fracture where it intersects the wellbore, the ease with which fluid can flow into or out of the fracture should increase. At the same time, the pressure gradient required to maintain that flow should decrease. Since fracture growth is accompanied by an increase in the fluid stored in the fracture, the quantity of fluid contained in a single flow oscillation should become a smaller and smaller fraction of total fracture volume. The fracture thus behaves as a large capacitor, becoming more and more effective at holding downhole pressure constant as its size increases. In the limiting case, a very large fracture would behave as a constant pressure boundary, although it is questionable whether this case is ever attained in practice. We therefore expect the downhole pressure oscillations associated with oscillatory flow to diminish as the fracture grows.

As anticipated from the above discussions, our pressure-and-flow measurement tool should detect a decreasing ratio of oscillatory pressure to oscillatory flow as the fracture grows. Analyzing the pressure-to-flow ratio provides a means of interpreting fracture dimensions.

In hydraulics, the ratio of oscillatory pressure (or hydraulic head) to oscillatory flow is called the hydraulic impedance, $Z$. The impedance is a complex number defined by the amplitude, frequency, and phase of the pressure and flow oscillations at a point. It is a function of the physical properties of the piping system and fluid. Impedance can be written in terms of oscillatory head H and flow Q as $$Z = \frac{He^{i\omega(t+\phi)}}{Qe^{i\omega t}} = \frac{H}{Q} e^{i\omega\phi} \quad (1)$$

where $\omega$ is the circular frequency in radians per second, $t$ is time in seconds, $\phi$ is the phase difference between the head and flow oscillations, and $i = \sqrt{-1}$. The relationship between head H and pressure P is $P = \rho g H$ where $\rho$ is fluid mass density and g is gravitational acceleration. Useful relationships between frequency $\omega$, frequency f (hertz) and period T (seconds) are: $f = \omega/2\pi$ and $T = 2\pi/\omega = 1/f$.

Another concept that will be valuable in our subsequent analyses is that of characteristic impedance $Z_c$. The characteristic impedance can be considered as a hydraulic impedance that describes the proportionally between head and flow moving in one direction only. In an infinite frictionless conduit, the phase difference between head and flow oscillations is either 0 or $\pi/\omega$, depending on whether the flow is moving in a positive or negative direction. The imaginary term in the expression for impedance (Eq. 1) vanishes and the characteristic impedance assumes a purely real value that can be shown to be $$Z_c = \frac{a}{gA} \quad (2)$$

where a is the acoustic wavespeed in the conduit, g is the acceleration of gravity, and A is the cross-sectional area of the conduit. In the analysis of impedance in hydraulic systems, it is convenient to distinguish between free oscillations and forced oscillations. The latter is also referred to as steady-oscillatory behavior. In the forced oscillation of a fluid system, oscillations are at the frequency of the forcing function and its harmonics. During a hydraulic fracturing treatment, forcing is provided by the reciprocating action of the pumps that inject fluid down the treatment well. The frequency of forcing is determined by the frequency of the piston strokes and higher-order harmonics. In contrast, free oscillations result from an initial, temporary excitation, such as the sudden removal of fluid from a pressurized well by valving, or the sudden opening of a hydraulic fracture at breakdown. Upon removal of the excitation, the oscillations attenuate as a result of natural physical damping in the system. The frequency of free oscillations is determined by the wavespeed of the fluid, the lengths of the system elements, and the physical properties of the system boundaries. The lowest frequency of free oscillations is termed the fundamental resonant frequency of the system. Higher-order harmonics will also be present.

Both free and forced oscillations occur throughout a typical hydraulic-fracturing treatment. Steady pumping result in a condition of forced oscillation, whereas free oscillaions are caused by suddenly starting or stopping the pumping and by numerous other disturbances that naturally occur during pumping. The same theoretical framework is used to evaluate both free and forced oscillations. In the former, the frequencies of interest are one or more of the natural frequencies of the system. In the latter, the frequencies of the forcing functions are used.

A detailed description of the preferred embodiment of this invention will be given with reference to the following figures:

FIG. 1 depicts free oscillations in a 1,589 m deep perforated well, (a) pre-fracture, and (b) post-fracture;

FIG. 2 depicts free oscillations in a 335 m (1100-ft.) deep well at Mounds, Okla. (a) above fracture closure pressure, and (b) at fracture closure pressure;

FIG. 3 depicts free oscillations in the Mounds well after injection of 207, 2,385 and 47,700 liters of water;

FIG. 4 depicts decay envelopes for free oscillations in the Mounds well following different volumes of water injection in liters: JJ=less than 800, A=800, T=1600, U=2400, V=30,350, and LL=47,700;

FIG. 5 comprises a schematic of a well completion and pressure measurement scheme for the Mounds tests;

FIG. 6 comprises graphs depicting forced oscillations of pressure at constant pump rate (a) at beginning of proppant injection, and (b) two minutes later;

FIG. 7 depicts phase changes of the 6 hertz pumping frequency during 10 minutes of proppant injection into the Mounds well;

FIG. 8 depicts (a) a hydraulic model of well and fracture, and (b) an electrical analog of the well and fracture;

FIG. 9(a) depicts fracture capacitance (in units of ft.$^2$) versus fracture radius for different fracture length-to-height ratios and a rock shear modulus of 2,000,000 psi; and (b) depicts the coefficient "s" versus the inverse of fracture length-to-height ratio.

Figure 13:
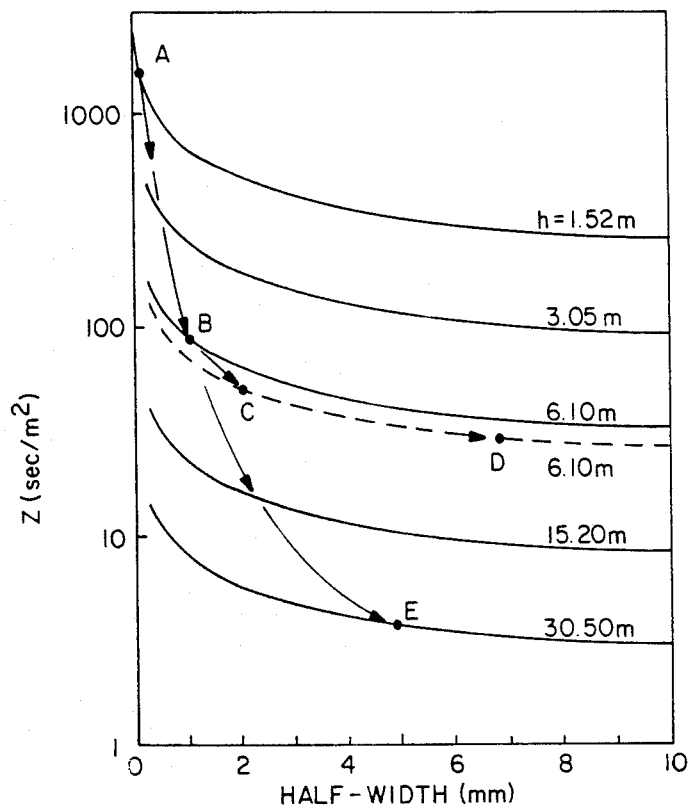

FIG. 10 shows theoretical decay of free oscillations in a frictionless well for which $Z_c = 11,250$ secs/m$^2$. From top to bottom, $R_f = 112,500$; 22,500; 11,250; 5,725; 2,812; 1,125; 562; and 56 secs/m$^2$;

FIG. 11 depicts the free oscillations vs. fracture capacitance for a one-way wave travel time, $T_d$, in the well of 0.5 seconds;

FIG. 12 depicts the wave speed in the fluid in the fracture versus fracture half width for different fracture radii (assuming a circular fracture);

FIG. 13 depicts the characteristic impedances of penny-shaped (solid lines) and plane strain (dashed line) fractures of different radii or half-height h.

Figure 14:
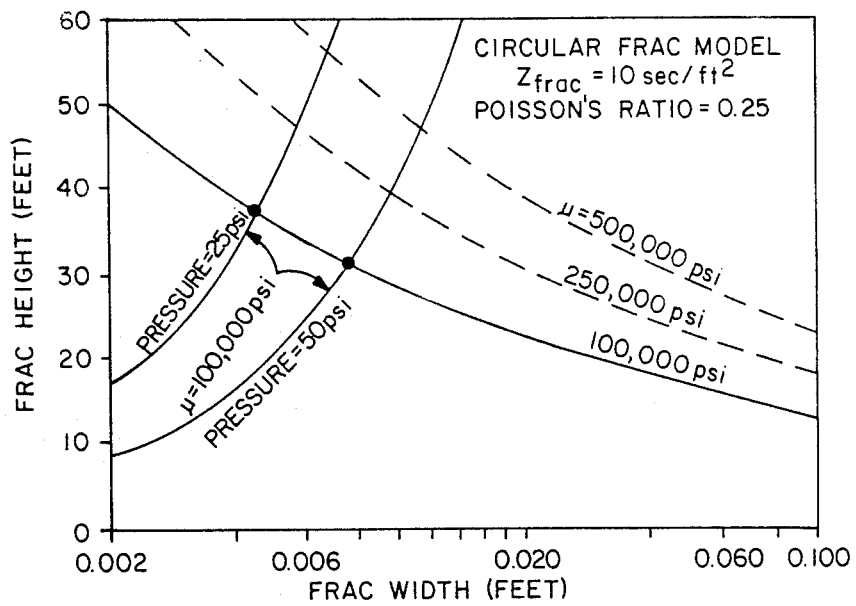

FIG. 14 depicts fracture height vs. width predicted by the impedance method (lines with negative slope) and by static inflation (lines with positive slope). Characteristic impedance of the fracture is 108 secs/m$^2$ (10 secs/feet$^2$).

FIGS. 15, 16, 17 and 18 illustrate various configurations of connections of pumping systems and pressure and flow measurement transducers to the wellbore and/or pipes in the wellbore for creating and measuring the desired oscillations.

The configuration of the surface and downhole pipe (tubing, casing, etc.) remains constant during a hydraulic-fracturing treatment, whereas the geometry of the fracture changes continuously as it is being created. Changes in oscillatory behavior observed under conditions of uniform excitation and constant fluid properties should therefore be related to the changing geometry of the one variable in the system: the hydraulic fracture. Three recent experiments provide examples of the effects of fracture growth on wellbore pressure oscillations.

In the first experiment (FIG. 1), a transient condition was initiated by rapidly removing a small volume of fluid (<10 liters) by abruptly valving at the well head. The well was cased to a total depth of 1589 m. There were 18 casing perforations between 1448 and 1395 m in the production zone whose permeability was several microdarcies. A packer was set in the 16-cm I.D. casing at a depth of 1296 m. Schematically, the well geometry was as shown in FIG. 17. Tubing from the well head to the packer had an I.D. of 6.2 cm. The viscosity of fluid in the well was approximately 80 cp. FIG. 1a shows free oscillations measured at the well head prior to fracturing. The period of these oscillations was 2L/a, where L is well depth and a is sonic wavespeed in the fluid in the well, about 1400 m/sec. FIG. 1b illustrates free oscillations at the well head recorded a few minutes after the completion of the 320,000-liter fracturing treatment. The period of these oscillations was approximately double the pre-fracturing case. Doubling of the period of free oscillations has also been reported by Anderson and Stahl, who performed tests on three wells in the 1960s.

The second experiment was conducted in a 330-m deep test well at Mounds that was cased (0.126-m I.D.) to a depth of 311 m. Below this depth was an open-hole completion in the Skinner sandstone (porosity 20%, permeability 20 millidarcies). All injections were down the casing with no tubing in the well, as shown schematically in FIG. 15. The two pressure records shown in FIG. 2 were made with water in the well after the sandstone had been hydraulically fractured. The well was shut in at these times and the pressure was declining as a result of leakoff into the formation. The first oscillations were recorded when the wellbore pressure was about 0.4 MPa above the statically determined fracture closure pressure. The oscillations continued for several cycles before damping out (FIG. 2a). In contrast, they camped out almost immediately after excitation at fracture closure pressure (FIG. 2b). Subsequently, free oscillations were initiated above fracture closure pressure after different volumes of water had been injected into that fracture. In every case, greater volumes were characterized by reduced rates of attenuation of the oscillations (FIG. 3). Plots of peak-to-peak amplitude vs. time (FIG. 4) clearly illustrate this effect.

The third experiment was conducted in the same Mounds test well with tubing run to the bottom of the casing and an open annulus, as shown schematically in FIG. 16. Pressure oscillations were measured at the top of the annulus, on the tubing at the well head, and on the treatment line near the two pump trucks used to pump the fracturing fluid (FIG. 5). Pressure records made during propant injection at a constant pump frequency indicated that the ratio of oscillatory annulus pressure to oscillatory well head pressure declined as pumped progressed (FIGS. 6a and 6b). This observation is consistent with the expected effect of a fracture behaving as a large capacitor if we assume that annulus pressure oscillations are directly proportional to pressure oscillations at the fracture orifice. We also observed that the relative phase of pressure oscillations on the annulus fell further behind the phase of oscillations at the well head and pump trucks as proppant injection progressed (FIG. 7).

A hydraulic well-fracture model was then developed and used to derive expressions for fracture impedance and the frequency and decay of free oscillations. This model shows how impedance derived from pressure and flow measurements can be used to evaluate fracture closure and dimensions.

The effect of fracture growth on wellbore pressure oscillations is illustrated using a simple model of a fracture intersecting the bottom of a well. In this model, the physical properties of the fracture are lumped into two parameters: the flow resistance $R_f$ at the fracture-well interface and the hydraulic capacitance, or storage of the fracture, $C_f$ (FIG. 8). The $R_f$ and $C_f$ elements are combined in series to reflect the fact that flow into the fracture must first overcome a resistance before fracture capacitance can be increased.

A change of hydraulic head $\Delta H_f$ in a fracture gives rise to a change of fracture volume $\Delta V_f$. We define the ratio of volume change to head change as the capacitance of the fracture. Green and Sneddon derived the relationship between uniform internal pressure and opening of an elliptical fracture in an infinite elastic medium. Following their results, we can write fracture capacitance as $$C_f = \frac{\Delta V_f}{\Delta H_f} = 8\rho g h^3 B(1 - v)/(3 \mu s) \qquad (3)$$

where h is fracture radius, $v$ Poisson's ratio, $\mu$ the shear modulus of the medium containing the fracture, B the half-length-to-half-height ratio of the fracture (l/h) and s a coefficient (derived from elasticity theory) that is a function of B (FIGS. 8a, 9a and 9b). Because capacitance is proportional to the cube of the fracture height, it increases rapidly as the fracture grows. When the half height exceeds 20 or 30 feet, flow oscillations of a few cubic feet per second should produce pressure oscillations at the well-fracture interface of no more than several psi (one psi equals about 2.3 feet of hydraulic head). The larger the fracture, the more effective it is at maintaining itself at relatively constant pressure during periods of pressure and flow oscillation in the wellbore.

The fracture resistance $R_f$ is the proportionally constant relating a change of flow in one direction into or out of the fracture to a corresponding change of hydraulic head. This proportionality constant is no more or less than the characteristic impedance of the fracture:

$$R_f = a_f/gA_f \tag{4}$$

where $a_f$ is wavespeed in the fracture, and $A_f$ is the cross-sectional area of the fracture perpendicular to the direction of flow.

We wish to analyze the impedance in our model well (FIG. 8) and its relationship to fracture growth, as expressed by the $R_f$ and $C_f$ parameters. For forced oscillation conditions, a reciprocating pump at the well head generates sinusoidal flow at a given frequency. For free oscillation conditions, excitation is by a sudden temporary flow change. The tubing or casing leading from the well head to the fracture is modeled as a frictionless pipe of length L. The characteristic impedance $Z_c$ of the well is given by equation (2) and the propagation constant $\gamma$ is given by $$\gamma = \frac{i\omega}{a} \tag{5}$$

Pressure transducers are connected to the top and bottom of the well to measure oscillatory pressure behavior. In addition, we assume that there is a sensor at the bottom of the well that measures flow oscillations into and out of the fracture. The bottom of the well is characterized by a lumped impedance $Z_f$ that is a function of the fracture constants $R_f$ and $C_f$:

$$Z_f = R_f + \frac{1}{i\omega C_f} \tag{6}$$

During a forced oscillation test, the fracture impedance can be determined in the following manner: a sinusoidal fluid flow of known frequency $\omega$ and known magnitude is set up at the well head. Once steady state is reached, the downhole pressure sensor will show a sinusoidal oscillation of the same frequency as the well head source but of a different magnitude. Similarly, the downhole flow oscillation will be at the same frequency but different magnitude. The magnitudes and phases of the downhole pressure and flow oscillations are recorded. Since flow and pressure have been measured, the magnitude of the fracture impedance can be determined by dividing these two quantities. once this has been done, the frequency of the flow source is changed and the whole process repeated. In this manner, the magnitude of the fracture impedance can be determined as a function of frequency.

In many fracturing jobs, downhole pressure and flow measurements are not available but well head measurements are. In these situations, the downhole (fracture) impedance must be determined by applying an impedance transformation to the well head impedance. If the magnitude and phases of well head pressure and flow have been measured, the complex-valued well head impedance is easily determined by vector division. Transformation from well head impedance $Z_w$ to downhole (fracture) impedance $Z_f$ is accomplished through the transformation:

$$Z_f = Z_c \frac{1 + \left[\frac{Z_w - Z_c}{Z_w + Z_c}\right] e^{-2\gamma L}}{1 - \left[\frac{Z_w - Z_c}{Z_w + Z_c}\right] e^{-2\gamma L}} \tag{7}$$

The impedance transformation can be carried out at different source frequencies to give downhole impedance as a function of frequency.

We now turn our attention to the case of free-oscillation testing. Our goal is to drive an equation that expresses the fracture impedance in terms of the frequency and rate of decay of the free oscillations. It is a well known result from steady-state Laplace analysis that the character of free oscillations is determined by the singularities of the impedance with respect to frequency. It can be shown that the well head impedance is $$Z_w = Z_c \frac{1 + \Gamma_f e^{2\gamma L}}{1 - \Gamma_f e^{2\gamma L}} \tag{8}$$

where $\Gamma_f$ is the downhole reflection coefficient given by $$\Gamma_f = \frac{Z_f - Z_c}{Z_f + Z_c} \tag{9}$$

Replacing $i\omega$ by u and using the definition of $\gamma$, it can be shown that $2\gamma L = uT_d$ where $u = \alpha + iw$ is complex frequency and $T_d = 2L/a$ is the two-way travel time up and down the wellbore. The poles (singularities) of Eq. (8) occur at values of u for which the denominator goes to zero, i.e., $$e^{-uT_d} = \Gamma_f \tag{10}$$

To study the effect of fracture resistance on the rate of decay of free oscillations, we assume a purely real impedance of $Z_f = R_f$ and a frictionless well of characteristic impedance $Z_c$. The downhole reflection coefficient is then real and given by $$\Gamma_f = \frac{R_f - Z_c}{R_f + Z_c} \tag{11}$$

In terms of this reflection coefficient, there are multiple values of u for which equality (10) is met. These are $$\omega = \text{imaginary}[u] = \frac{n\pi}{T_d} \tag{12}$$

and $$\alpha = \text{real}[u] = \frac{-\ln|\Gamma_f|}{T_d} \tag{13}$$

where n is odd for $\Gamma_f < 0$ and n is even for $\Gamma_f > 0$. The imaginary part of u determines the frequency of the free oscillations while the real part of u determines the rate of decay. More specifically, the fundamental natural frequency is $$f = \omega/2\pi = \begin{array}{l} a/4L \quad \Gamma_f < 0 \\ a/2L \quad \Gamma_f > 0 \end{array} \quad (14)$$

The system oscillates at odd harmonics for fracture resistances below the characteristic impedance of the wellbore ($\Gamma_f < 0$) and at even harmonics for fracture resistances above the characteristic impedance ($\Gamma_f > 0$). This behavior was observed in our field tests described earlier (FIGS. 1 and 3). The time constant of the free-oscillation decay is $$\tau = \frac{1}{|\alpha|} = \frac{|\Gamma_f|}{1 - |\Gamma_f|} T_d \quad (15)$$

Notice that $\tau$ approaches infinity (zero decay) as the magnitude of the reflection coefficient approaches $\pm 1$. That is, the rate of decay becomes extremely slow as the fracture impedance approaches either zero (no fracture) or infinity (completely open fracture). Also notice that the time constant $\tau$ goes to zero as the reflection coefficient goes to zero. That is, free oscillation will not occur when the fracture is open to a point where the fracture impedance and the characteristic impedance of the wellbore are equal. This explains the effect observed in FIG. 2b. The theoretical effect of purely resistive fracture impedances on free oscillations in a frictionless well is shown in FIG. 10.

To study the effect of fracture capacitance on the frequency of free oscillation, assume a purely capacitive fracture impedance of the form $Z_f = 1/C_f u$. The downhole reflection coefficient of Eq. 9 then becomes $$\Gamma_f = \frac{1 - Z_c C_f u}{1 + Z_c C_f u} \quad (16)$$

For a frictionless well and capacitive fracture, the singularities of Eq. (8) must occur at purely imaginary values of u. Thus we can assume that $u = i\omega$ and find the values of $\omega$ for which equality (10) is met. This turns out to give an equation of the form $$Z_c C_f \omega = \tan(\omega T_d/2) \quad (17)$$

Equation (17) was evaluated for several values of $C_f$ to generate the plot of natural frequency vs. fracture capacitance shown in FIG. 11. A value for the characteristic well impedance was taken from the Mounds well: $Z_c = 11,250 \text{ sec/m}^2$. Notice that as $C_f$ varies from 0 to $\infty$, the natural frequency of the free oscillations shifts from $a/2L$ (an even harmonic) down to $a/4L$ (an odd harmonic). Most of the shift is accomplished when fracture capacitances are between about $10^{-6}$ and $10^{-4}$ m$^2$.

As shown above, the amplitude and decay of pressure oscillations in the wellbore are strongly dependent on the resistive characteristics of the hydraulic fracture. By equating fracture resistance to the characteristic impedance of a fracture, we can now define a procedure for deriving fracture size estimates. Characteristic impedance of a fracture is given by:

$$R_f = \frac{a}{gA} \quad (18)$$

where A is the area of the fracture where it intersects the well and a is the wavespeed in the fracture. Fracture wavespeed can be derived from the following expression $$a = \left[ \frac{K/\rho}{1 + (K/A)(\Delta A/\Delta P)} \right]^{\frac{1}{2}} \quad (19)$$

where $\Delta A/\Delta P$ is the area change corresponding to a fluid pressure change $\Delta P$. In a stiff conduit such as a cased well, the denominator is very close to 1 and the wavespeed is close to $(K/\rho)^{\frac{1}{2}}$, that of a perfectly rigid pipe. For water, this limiting wavespeed is about 1440 m/sec. Wavespeeds in the two test wells discussed previously were measured at about 1400 m/sec.

For a very compliant conduit such as a hydraulic fracture, the denominator in Eq. (19) is large with respect to unity and the wavespeed in the conduit is very slow. In this case Eq. (19) simplifies to $$a = [(\Delta P \, A)/(\rho \Delta A)]^{\frac{1}{2}} \quad (20)$$

We can estimate wavespeeds in hydraulic fractures and their relationship to fracture dimensions by considering the expansion of a fracture resulting from uniform changes of internal pressure. The change of area of a cross-section drawn through the center of a penny-shaped fracture is $$\Delta A = 2\Delta P h^2 (1 - \nu)/\mu \quad (b\,21)$$

In general, the change of area of a cross-section through the center of an elliptical fracture (FIG. 8a) is $$\Delta A = 2\Delta P h^2 (1 - \nu)/\mu s \quad (22)$$

where s is given in FIG. 9b.

Substituting (22) into (20) and using the formula for the area of an ellipse, $A = \pi b h$, the following expression for wavespeed results:

$$a = \left[ \frac{\pi b \mu s}{2\rho h(1 - \nu)} \right]^{\frac{1}{2}} \quad (23)$$

where b is half-width of the ellipse. Evaluation of this equation for the penny-shaped case (S-1.0) reveals that wavespeeds in the fracture can be extremely slow with respect to those in the well (FIG. 12).

We can now define the fracture impedance in terms of fracture dimensions and elastic properties. Assuming that the fracture has an elliptical cross section where it intersects the well and that it is bi-winged so that it intersects the well on two sides, we can use Eqs. (18) and (23) to write)

$$R_f = \left[ \frac{\mu s}{8g^2 \rho \pi (1 - \nu)} \right]^{\frac{1}{2}} \left[ \frac{1}{bh^3} \right]^{\frac{1}{2}} \quad (24)$$

where $R_f$ is the characteristic impedance of the fracture where it intersects the wellbore.

FIG. 13 comprises plotted curves of impedance vs. fracture half-width for penny-shaped fractures of several different radii (solid lines). One curve (dashed line) is the impedance of an infinitely long fracture (h/l=0) with a half-height of 6.10 m. FIG. 13 illustrates a way in which changes of fracture characteristic impedance can help track fracture growth. Assume the fracture begins to grow as an expanding penny, maintaining a constant aspect ratio (b/h) until it meets a barrier to vertical growth. When the barrier is met, height growth is arrested and the fracture begins to lengthen. Path A-B-E (FIG. 13) shows the rapid drop of impedance that occurs during uniform radial expansion. When the growth barrier is met, say at h=6.10 m, continued lengthening and widening of the fracture will result in a rate of impedance fall-off (path B-C-D) that is reduced with respect to the previous rate of fall-off. In contrast, if the fracture were to continue to grow radially without confinement, the impedance fall-off would follow the path B-E. Continuous monitoring of $R_f$ during a fracturing treatment should therefore reveal whether fracture growth was dominated by radial expansion or whether vertical containment was established and maintained.

This analysis also helps explain why well and fracture impedances may be matched at the fracture closure pressure (FIG. 2b). FIG. 13 indicates that the fracture characteristic impedance rises abruptly when the fracture width drops below about one millimeter. As the width drops below a few hundredths of a millimeter, the fracture impedance rises rapidly toward the characteristic impedance of the well. The characteristic impedance of the Mounds, Oklahoma test well is fairly typical at 11,250 sec/m², assuming frictionless conditions. Thus, by the time the fracture and well impedances match, the fracture has become so narrow that it can be considered closed for all practical purposes.

One more equation is necessary in this approach for determining fracture size. It is the equation relating fracture half-width, b, half-height, h, and uniform internal pressure, $P_e$, in an elliptical fracture (FIG. 8a). The pressure $P_e$ is the pressure in the fracture in excess of the pressure at which the fracture would close. This equation is:

$$b = \frac{2P_e h (1 - \nu)}{\pi \mu s} \quad (25)$$

The pressure $P_e$ is obtained by measuring the pressure at the wellfracture intersection point (this is done using methods well known in the field) and subtracting the fracture closure pressure. Additional methods for measuring fracture closure pressure will be described in subsequent paragraphs.

The problem of obtaining fracture dimensions is now reduced to one of determining three unknowns, b, h and l (FIG. 8a) from three simultaneous equations (eq. 3, 24, 25). This is done using well known algebraic techniques and the process of determining the fracture dimensions is complete.

As an example of the usefulness of this method, one can use equations (24) and (25) to obtain a fracture radius and width corresponding to a particular value of impedance for the case of a penny-shaped fracture. FIG. 14 shows curves of fracture radius vs. width corresponding to a fracture impedance of 108 sec/m². By themselves, these curves place broad constraints on fracture size. However, once the pressure $P_e$ in the fracture is established, the specific radius and width of the fracture can be determined. The second set of curves in FIG. 14 (the curves with positive slope) are drawn using eq. (25). The intersection points of the two sets of curves give exact fracture dimensions for the corresponding values of rock shear modulus, $\mu$, and pressure $P_e$. That is, the intersection points define the fracture radius and width corresponding to particular values of $R_f$, shear modulus and fracture pressure. The accuracy of this method of determining fracture dimensions depends on the accuracy with which fracture $R_f$, mean pressure, shear modulus, and Poisson's ratio can be determined.

The analytical expressions for fracture wavespeed presented above are based on Sneddon's (1946) and Green & Sneddon's (1950) expressions for elastic fracture opening under uniform internal pressure. The method of this invention is not limited to use of Sneddon's equations. Any expression relating fracture opening to pressure change in the fracture, whether uniform or nonuniform, can be used to derive an appropriate relationship between impedance and fracture size.

Whereas the foregoing discussion has described how fracture dimensions can be estimated by measuring hydraulic impedances and comparing them to the impedances calculated for wells with different sizes of fractures, the method of this invention does not require the measurement of impedance. Oscillatory pressure measurements alone (without contemporaneous flow measurements) can be used to estimate fracture dimensions. In many practical cases it is not possible to measure oscillatory flow, although oscillatory pressure can be measured rather easily using conventional equipment. To obtain fracture dimensions from oscillatory pressures only, oscillatory pressures are measured at one or more points in the well or in the surface tubular goods and displayed as shown in FIGS. 1, 2, 3, 4 and 6. These measured pressures are then compared to the calculated pressures at the same points that would result from fractures with different $R_f$ and $C_f$ values. The $R_f$ and $C_f$ values that yield calculated oscillatory pressures that are closest to the measured oscillatory pressures are taken as the $R_f$ and $C_f$ values of the actual fracture and used to derive fracture dimensions by applying the procedures described above.

Whereas the foregoing discussion has described how fracture dimensions can be estimated by determining a fracture impedance and then relating this impedance to fracture dimensions using elasticity theory, other approaches can also be used to obtain fracture dimensions. Rather than using a resistive-capacitive, or lumped fracture model, one can derive a model of a fracture with exact dimensions, such as a penny-shaped fracture or a rectangular fracture in the solid earth. The equations describing fluid flow can then be solved to yield predictions for pressure oscillations or impedances at difference points in the wellbore. These predictions are then compared to actual field measurements. The dimensions of the fracture in the model that most closely corresponds to the field measurements are then taken as the actual hydrofracture dimensions.

An example of a simple approach that considers oscillatory flow in the fracture explictly is what can be called the fracture resonance approach. This formulation assumes that pressure waves in the fracture travel from the wellbore to the ends of the fracture where they are reflected and again return to the wellbore before being fully attenuated by friction. In this manner, a resonance in the fluid in the fracture is set up with a frequency of a/2L or some multiple thereof, where a is now the wavespeed in the fracture and L is now the length of one wing of the fracture. L could also be the radius of a radially symmetric fracture. By forcing the well with an oscillatory driver at the well head, e.g., a piston pump, it should be possible to excite the fracture at its lowest resonant frequency, identify the resonance, and then compute fracture wing length using the wavespeed in the fracture.

The five primary steps in this process of determining hydraulic fracture closure pressure and dimensions are (1) installation of sensors; (2) signal generation; (3) data measurement and recording; (4) data processing; and (5) data interpretation.

The process can be applied in a well of any tubular goods design. What is important is that the geometry of the well design be known so that it can be accurately incorporated during step 5 above. The invention can be applied in cased wells, in uncased wells, and in partially cased wells. It can also be applied in wells that are fully cased and perforated. Further details of the above five steps are given in the following paragraphs:

Step 1. The pressure and/or flow sensor(s) used must be of great enough resolution to be able to resolve a pressure and flow oscillation of a magnitude needed for the subsequent interpretation. Numerous combinations of sensor placement are possible during application of the invention. Some possible sensor placements are shown in FIGS. 15-18. FIG. 15 illustrates a well that has no tubing in it. FIG. 16 is a well with tubing in it and with an open annulus. FIG. 17 shows a well with tubing and with a packer creating hydraulic isolation between the tubing and the annulus. FIG. 18 is a well with tubing in it and with an open annulus. In FIG. 18, injection from the pump is down the annulus portion of the well rather than down the tubing portion (FIG. 16). Pressure and/or flow transducers can be in one or more positions in any of these well geometries. Some example positions are shown in FIGS. 15-18, where P1-P6 refer to pressure transducers and F1-F6 refer to flow transducers. If both pressure and flow transducers are used at one position, the oscillatory pressure can be divided by the oscillatory flow to obtain the impedance at that position at a given time. If a pressure transducer or flow transducer only is used, then oscillatory pressure or flow, rather than impedance, is used to obtain $R_f$ and $C_f$ for the subsequent analysis.

The sensors should be placed in or on the well tubular goods prior to the beginning of signal generation.

Step 2. Oscillatory pressures and/or flows constitute the signals used to obtain information about fracture dimensions and fracture closure pressure in this invention. These oscillations can be at any frequency as long as they are not fully attenuated (within the resolution of the sensors) by the time they travel from the fracture to the nearest pressure or flow sensor. Signals are generated in the following manner:

A. Free oscillations: with the well under positive net pressure at the well head, steady conditions in the well are pertubed abruptly. Steady conditions are defined as conditions that are invariant over time. The necessary perturbation (or excitation) may be in the form of (1) abrupt release of fluid from a point in the well tubular goods; (2) abrupt injection of fluid from a point in the well tubular goods; (3) abrupt pressurization of fluid at a point in the well tubular goods; (4) abrupt depressurization of fluid at a point in the well tubular goods. The perturbation may be induced by manual or automatic valves, pistons, compressed air injections or other methods. It may also occur spontaneously by sudden change in the fracture volume.

B. Forced oscillations: forced oscillations can be induced by reciprocating or other types of pumps, by periodic valve opening and closing or any device or valve that inputs a regular and continuous oscillation into the fluid in the well. Continuous for purposes of this invention is defined as regular and repeated for more than one oscillation cycle. Examples of pumps that can be used to excite forced oscillations are (1) triplex pumps, which are positive-displacement piston pumps, and (2) pumps that create a flow oscillation but do not produce any net injection into the well tubular goods. Such pumps can include, but are not limited to, single-piston devices that cyclically inject and withdraw a small amount of fluid into and out of the well tubular goods. The advantage of devices in category (2) is that no net enlargement of the fracture emanating from the well is induced during the period of signal generation.

Step 3. During application of this process, data is measured from each of the pressure and/or flow sensors in or on the well tubular goods. Measurement can be with an analog system such as one or more strip chart recorders or magnetic tape recorders, or with a digital system consisting of an analog-to-digital converter, a computer, and a digital storage medium (e.g., magnetic disk or tape, or built-in computer memory). Dynamic range of the recording system, whether digital or analog, should be great enough to resolve the smallest oscillations required to apply steps 4 and 5, as described below. Frequency response should likewise be great enough to resolve the highest and lowest frequencies required to apply steps 4 and 5.

The digitization rate in a digital system should be at least as fast as the Nyquist frequency of the highest frequencies used in steps 4 and 5.

Step 4. Data processing to obtain useful information about the fracture consists of one or more of the following processes.

Determination of fracture closure: time series plots should be made of free oscillations in the well at different mean pressure values. These plots should then be compared. Fracture closure pressure is the highest mean pressure for which the oscillations damp out after no more than two complete cycles (after adjustment for viscous damping in the well). If oscillations are present for all of the mean pressures investigated, closure pressure is the highest mean pressure for which further reduction of mean pressure causes no further change in the decay rate or pattern of the oscillations.

Closure pressure can also be determined from forced oscillation recordings. This procedure consists of plotting the amplitude of pressure oscillations vs. frequency. Closure pressure is the mean pressure at which this amplitude does not increase when the well is forced at its normally resonant frequencies. If such behavior is not observed in the data, closure pressure is the greatest mean pressure for which a further reduction in mean pressure does not result in significant change in a plot of impedance or oscillatory pressure amplitude vs. frequency.

Other methods for obtaining fracture closure pressure are given after the discussion of Step 5.

Determination of fracture position: if there is uncertainty as to the depth of the fracture in the wellbore, this uncertainty can be resolved by inflating the fracture and then exciting free or forced oscillations in the well. The frequency content of these oscillations is then determined by fast Fourier transform (FFT), linear prediction or other data processing techniques. The resonant frequencies of the well will be indicated by this frequency analysis. These resonant frequencies are dependent on the depth of the fracture L, which can be evaluated using the procedures outlined in equations (7) through (17).

Processing for fracture dimensions using free or forced oscillations: If oscillatory pressures and oscillatory flows have both been measured, impedance at the measurement point is obtained by dividing the former by the latter. Impedance transformation equations are then used to obtain fracture impedance, as described earlier in this disclosure. The real and imaginary terms in the fracture impedance are separated to obtain $R_f$ and $C_f$ respectively. $R_f$ and $C_f$ are then used in Step 5 to obtain fracture dimensions.

If only oscillatory pressures in the well have been measured, they are compared to pressures calculated using hydraulic models of a well with the same geometry and different fracture $R_f$ and $C_f$ values. The process of comparison may be by graphical analysis, maximum entropy techniques, or other digital processing techniques. The best fit between the model data and the measured data gives the $R_f$ and $C_f$ values of the actual fracture. These $R_f$ and $C_f$ values are used in Step 5 to obtain fracture dimensions.

Step 5. The pressure $P_e$ in the fracture, at the time for which it is desired to compute fracture geometry, is determined using methods described elsewhere herein. $R_f$ and $C_f$ values are then used in conjunction with $P_e$ to solve equations (3), (24) and (25) to obtain the fracture dimensions shown in FIG. 8a. Other fracture models can also be used in the interpretation procedure. The fracture can be numerically modelled on a computer as a rectangular or elliptical conduit using widely known methods. This model is then applied to generate a set of pressure oscillations that are compared to the true data. The model fracture dimensions (elliptical, rectangular, or of some other geometric shape) producing oscillations most closely corresponding to the data are taken as the true dimensions.

Impedance analysis is a promising new tool for hydraulic-fracture diagnostics. Growth of a hydraulic fracture results in a continuous change of downhole impedance at the well-fracture interface. This change can be used to evaluate fracture dimensions. The first step in such an evaluation is to measure downhole impedance directly or determine it from well head measurements using impedance transfer functions. After fracture impedance has been obtained, it is used to define the resistive $R_f$ and capacitive $C_f$ properties of the fracture, and these properties are then used in deriving fracture dimensions. If only well head pressure measurements are available, fracture impedance can be determined by constructing a hydraulic model of the well and fracture, and then finding the impedance that produces the measured pressure oscillations. The $R_f$ and $C_f$ values that comprise this impedance are then used in computing fracture dimensions.

This invention includes four methods of obtaining fracture closure pressure. The first method consists of finding the pressure at which free and/or forced oscillations are critically damped, as described above and illustrated in FIG. 2b. The second consists of finding the pressure at which the fundamental frequency of oscillations in the well and/or the frequency of higher-order harmonics shifts dramatically, as illustrated in FIG. 11. A large shift of this nature is indicative of a change from open to closed fracture conditions, or vice versa. The third method consists of "pulsing" the well repeatedly by opening a valve and releasing a small quantity of fluid. Every time the well is pulsed, free oscillations will result, as shown in FIGS. 1, 2 and 3. When the oscillations have damped out and pressure has again reached a constant value, this constant value of pressure is compared to the initial constant pressure prior to the pulse. The difference in these two pressures is plotted vs. the initial constant pressure prior to the pulse. When an open fracture is present, the storage (capacitance) of the fracture replaces the fluid removed by the pulse. When the fracture is closed, this fluid is not replaced and the pressure drop following the pulse is greater than for the open-fracture case. Thus, the plot of initial constant pressure vs. constant pressure drop will show two plateaus. The initial constant pressure for which the pressure drop falls between the two plateaus is the fracture closure pressure. Resolution of fracture closure pressure is improved by increasing the frequency of pulses.

The fourth method of determining fracture closure pressure requires that tubing be in the well and that an open annulus between the tubing and the casing of the well be present, as shown in FIGS. 16 and 18. When a "pulse" is initiated at the well head by opening a valve and releasing a small volume of fluid, this pulse travels down the well at a low-pressure wave until it reaches the bottom. If an open fracture is present, the pulse will draw fluid from the fracture and a high-pressure wave will travel back up the well. In this case, a low-pressure pulse initiated on the annulus will return to the well head as a high-pressure pulse in the tubing. If the pulse were initiated in the tubing, it would return to the well head as a high-pressure pulse in the annulus. If the fracture is closed, the low-pressure pulse traveling down the tubing (or annulus) cannot withdraw fluid from the fracture. Upon reaching the bottom of the well it must pull fluid from the annulus if it is traveling down the tubing, or from the tubing if it is traveling down the annulus. In the closed fracture case, a low-pressure pulse will return to the well head. Therefore, fracture closure pressure can be obtained by initiating a series of pulses on the tubing or annulus, respectively, and then recording whether the pulse that returns to the well head in the annulus or tubing, respectively, is initially in a negative or a positive direction. The fracture closure pressure is the pre-pulse pressure at which the returned wave changes from negative to positive (or from positive to negative, depending on whether average pressure has been increasing or decreasing, and whether the initial downgoing pulse was positive or negative).

Other variations of the methods described may occur to a person of skill in the art. For example, the number and position of transducers (illustrated in FIGS. 15–18) may be modified without departing from the basic spirit and scope of the invention. Therefore, the full scope of the invention is to be defined by the following claims.

What is claimed:

1. A method of determining the position and dimensions of a subsurface fracture intersecting an existing wellbore in the earth comprising the steps of
   creating an oscillation within the wellbore,
   measuring oscillation in pressure and flow in the wellbore to define impedance at one or more measurement points, and
   utilizing the impedance measured to define a model of the fracture.

2. A method as in claim 1 wherein the measuring step includes measuring amplitude, frequency and phase of pressure and flow oscillations at a point in or coupled to the wellbore.

3. A method as in claim 1 wherein the measuring step includes measurements at a plurality of locations within the well and attached piping.

4. A method as in claim 1 wherein the measuring step consists of measurements at the well head only.

5. A method as in claim 1 wherein the measuring step consists of measurements at a single point other than at the well head.

6. A method as in claim 1 wherein the step of modelling the fracture comprises the step of calculating the hydraulic impedance in terms of measured oscillatory head H and flow Q as $$Z = \frac{He^{i\omega(t+\phi)}}{Qe^{i\omega t}} = \frac{H}{Q}e^{i\omega\phi}$$

where $\omega$ is the circular frequency in radians per second, t is time in seconds, $\phi$ is the phase difference between the head and the oscillations, and $i=\sqrt{-1}$, and wherein the relationship between head H and pressure P is P=$\rho$gh where $\rho$ is fluid mass density and g is gravitational acceleration.

7. A method as in claim 6 wherein the calculating step is repeated at a plurality of different frequencies.

8. A method as claimed in claim 6 of calculating fracture impedance comprising the steps of
  locating pressure and flow sensors in the wellbore beside the fracture and calculating fracture impedance by dividing oscillatory head by oscillatory flow.

9. A method as claimed in claim 6 of calculating fracture impedance $Z_f$ as a function of frequency utilizing an impedance transformation $$Z_f = Z_c \frac{1+\left[\frac{Z_w-Z_c}{Z_w+Z_c}\right]e^{-2\gamma L}}{1-\left[\frac{Z_w-Z_c}{Z_w+Z_c}\right]e^{-2\gamma L}}$$

wherein $Z_w$ is measured well head impedance and $Z_c$ is the characteristic impedance of the well.

10. A method as in claim 9 wherein the impedance is calculated at a number of frequencies to provide fracture impedance as a function of frequency.

11. A method as claimed in claim 1 including the step of creating a pressure wave in the fracture at a frequency that forces the fracture into resonance.

12. A method as in claim 1 wherein fracture impedance is defined as $Z_f = R_f + 1/i\omega C_f$, where $R_f$ is the proportionality constant between hydraulic head change $\Delta H_f$ and instantaneous flow $\Delta Q_f$ into or out of the fracture; and where $C_f$ is the storage, or capacitance, of the fracture, defined as $\Delta V_f/\Delta H_f$, in which $\Delta V_f$ is the change in fracture volume.

13. A method as in claim 12 wherein $C_f = 8\rho g B h^3(1-v)/(3\mu s)$, in which B is the half-length-to-half-height ratio of the fracture, 1/h, assuming an ellipsoidal fracture shape.

14. A method as in claim 12 wherein $$R_f = \left[\frac{\mu s}{8g^2\rho\pi(1-v)}\right]^{\frac{1}{2}}\left[\frac{1}{bh^3}\right]^{\frac{1}{2}}$$

for an assumed elliptical fracture cross section, where $\mu$ is the shear modulus of the rock containing the fracture, s is a function of the height-to-length ratio of the fracture, $v$ is the Poisson's ratio of the rock containing the fracture, b is the half-width of the fracture at its center, and h is the half-height of the fracture at its center.

15. A method as in claim 14 in which $R_f$ or $C_f$ have values consistent with the mechanical properties of an ellipsoidal fracture in an elastic medium.

16. A method as in claim 14 in which $R_f$ or $C_f$ have values consistent with the mechanical properties of a nonellipsoidal fracture in an elastic medium.

17. A method as in claim 12 including the step of establishing a static pressure in the fracture in excess of fracture closure pressure from the readings of one or more pressure sensors.

18. A method as in claim 17 including the step of relating said static pressure $P_e$ to fracture dimensions using the equation $$b=2P_e h(1-v)/(\pi\mu s)$$

assuming an ellipsoidal fracture.

19. A method as in claim 17 including the step of relating said static pressure to fracture dimensions using the elastic properties of a nonellipsoidal fracture in an elastic medium.

20. A method as in claim 1 wherein impedance at the fracture is computed and the real and imaginary components of impedance are used to define $R_f$ and $C_f$ respectively, according to the relationship fracture impedance $Z_f = R_f + 1/i\omega C_f$, where $R_f$ is the proportionality constant between hydraulic head change $\Delta H_f$ and instantaneous flow $\Delta Q_f$ into or out of the fracture; and where $C_f$ is the storage, or capacitance, of the fracture, defined as $\Delta V_f/\Delta H_f$, in which $\Delta f$ is the change in fracture volume.

21. A method as in claim 1 wherein values of $R_f$ and $C_f$ and $P_e$ are used to simultaneously solve the equations assuming an ellipsoidal fracture $$R_f = \left[\frac{\mu S}{8g^2\rho\pi(1-v)}\right]^{\frac{1}{2}}\left[\frac{1}{bh^3}\right]^{\frac{1}{2}}$$

$$C_f = 8\rho g B h^3(1-v)/(3\mu s)$$

and $$b=2P_3 h(1-v)/(\pi\mu s)$$

where $\mu$ is the shear modulus of the rock containing the fracture, s is a function of the height-to-length ratio of the fracture, $v$ is the Poisson's ratio of the rock containing the fracture, b is the half width of the fracture at its center, h is the half-height of the fracture at its center,
B is the half-length-to-half-height ratio of the fracture, 1/h, assuming an ellipsoidal fracture shape,
and $P_e$ is static pressure, to obtain fracture dimensions.

22. A method as in claim 1 wherein the well contains no internal tubing.

23. A method as in claim 22 wherein the pumping step includes the step of establishing a positive net pressure at the well head, and abruptly disturbing the steady conditions in the well.

24. A method as in claim 22 including the step of determining fracture closure pressure subsequent to said pumping process.

25. A method as in claim 22 wherein the well is cased from the ground surface to the bottom and communicates to a hydraulic fracture through casing perforations.

26. A method as in claim 22 wherein the well is cased except in open-hole zones that may be connected to hydraulic fractures.

27. A method as in claim 22 wherein the well is uncased.

28. A method as in claim 1 wherein the wellbore has tubing located therein to define an open annulus between wellbore and tubing.

29. A method as in claim 28 including the step of deploying sensors inside said tubing and in the annulus.

30. A method as in claim 28 including the step of installing packing at the bottom of the annulus defined by the tubing to create hydraulic isolation between the annulus and the said pumping step being carried out by pumping fluid down the tubing.

31. A method as in claim 28 wherein the step of pumping fluid is carried out by pumping fluid down said annulus, sensors being located in said tubing, outside said tubing in the annulus, and at the end of said tubing.

32. A method of determing the dimensions of a subsurface fracture intersecting an existing wellbore in the earth comprising the steps of creating an oscillation within the wellbore, measuring pressure oscillations within the wellbore resulting from said created oscillation, comparing said measured pressures to a set of theoretical pressure oscillations for models of the same wellbore in which the wellbore intersects fractures whose dimensions result in different impedances, selecting the one of said models having pressure oscillations most closely resembling the measured pressure oscillations, and using the fracture impedance of the selected model to derive the dimensions of the fracture that intersects said existing wellbore.

33. A method as in claim 1 in which the resistive and capacitive properties of the fracture, as derived from measured pressure oscillations, are used to calculate the dimensions of a nonellipsoidal fracture.

34. A method of determining the dimensions of a subsurface fracture intersecting an existing wellbore in the earth comprising the steps of creating a resonance in the fluid in the fracture with a frequency of $a/2L$ where $a$ is the wavespeed in the fracture and $L$ is the length of a wing of the fracture or radius of a radially symmetric fracture, and computing fracture wing length $L$ using wavespeed in the fracture.

35. A method as in claim 34 including the step of forcing the well with an oscillatory driver at the well head to excite the fracture at one or more of its resonant frequencies.

* * * * *

UNITED STATES PATENT AND TRADEMARK OFFICE
CERTIFICATE OF CORRECTION

PATENT NO. : 4,783,769

DATED : November 8, 1988

INVENTOR(S) : Gary R. Holzhausen, et al.

It is certified that error appears in the above-identified patent and that said Letters Patent is hereby corrected as shown below:

In the References Cited, "Weste" should read --Western--.

In the References Cited, "198" should read --1986--.

In the References Cited, "Volcnic" should read --Volcanic--.

Col. 2, line 10, "tion" should read --ture--.

Col. 3, lines 60-61, "a", "g" and "A" should read --$\underline{a}$--, --$\underline{g}$-- and --$\underline{A}$--.

Col. 4, line 19, "result" should read --results--.

Col. 8, line 13, "drive" should read --derive--.

Col. 9, line 22, "π" should read --τ--.

UNITED STATES PATENT AND TRADEMARK OFFICE
CERTIFICATE OF CORRECTION

PATENT NO. : 4,783,769

DATED : November 8, 1988

INVENTOR(S) : Gary R. Holzhausen, et al.

It is certified that error appears in the above-identified patent and that said Letters Patent is hereby corrected as shown below:

Col. 10, line 28, "(b 21)" should read --(21)--.

Col. 10, line 54, "write)" should read --write.--.

Col. 12, line 63, "a" should read --$\underline{a}$--.

Col. 12, line 64, "L" should read --$\underline{L}$--.

Col. 18, line 34, "$\Delta f$" should read --$\Delta V_f$--.

Col. 20, line 13, "claim 1" should read --claim 32--.
On the title page, Item [75] should read
--Inventors are: Gary R. Holzhausen, Santa Cruz, California;
Richard P. Gooch, Palo Alto, California; and
David E. Goldberg, Tuscaloosa, Alabama. --.

Signed and Sealed this

Ninth Day of May, 1989

*Attest:*

DONALD J. QUIGG

*Attesting Officer*  *Commissioner of Patents and Trademarks*